(12) United States Patent
Kenny et al.

(10) Patent No.: US 8,314,837 B2
(45) Date of Patent: Nov. 20, 2012

(54) SYSTEM AND METHOD FOR IMAGING WITH ENHANCED DEPTH OF FIELD (75) Inventors: Kevin Bernard Kenny, Niskayuna, NY (US); David LaVan Henderson, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 608 days.

(21) Appl. No.: 12/579,965

(22) Filed: Oct. 15, 2009

(65) Prior Publication Data
US 2011/0090326 A1  Apr. 21, 2011

(51) Int. Cl.
H04N 9/47 (2006.01)
(52) U.S. Cl. ......................................... 348/79
(58) Field of Classification Search ....... 348/79
See application file for complete search history.

(56) References Cited

U.S. PATENT DOCUMENTS

| | | | |
|---|---|---|---|
| 4,661,986 A | 4/1987 | Adelson | |
| 5,912,699 A | 6/1999 | Hayenga et al. | |
| 6,201,899 B1 | 3/2001 | Bergen | |
| 6,320,979 B1 | 11/2001 | Melen | |
| 6,433,325 B1 | 8/2002 | Trigg | |
| 6,793,390 B2 * | 9/2004 | Wang et al. | 378/174 |
| 7,027,628 B1 | 4/2006 | Gagnon et al. | |
| 7,209,293 B2 | 4/2007 | Gaida et al. | |
| 7,365,310 B2 | 4/2008 | Truche et al. | |
| 7,737,975 B2 * | 6/2010 | Sato et al. | 345/426 |
| 7,842,926 B2 * | 11/2010 | Olsson et al. | 250/370.08 |
| 2002/0181762 A1 | 12/2002 | Silber | |
| 2003/0151674 A1 * | 8/2003 | Lin | 348/222.1 |
| 2003/0214706 A1 | 11/2003 | Maddison | |
| 2005/0163390 A1 | 7/2005 | Chiang | |
| 2006/0007533 A1 | 1/2006 | Eichhorn et al. | |
| 2006/0038144 A1 | 2/2006 | Maddison | |
| 2006/0045505 A1 | 3/2006 | Zeineh et al. | |
| 2006/0127880 A1 * | 6/2006 | Harris et al. | 435/4 |
| 2006/0171582 A1 | 8/2006 | Eichhorn | |
| 2008/0234984 A1 | 9/2008 | Ortyn et al. | |
| 2010/0329586 A1 * | 12/2010 | Stellari et al. | 382/284 |

* cited by examiner

Primary Examiner — Larry Donaghue
(74) Attorney, Agent, or Firm — Jason K. Klindtworth (57) ABSTRACT A method for imaging is presented. The method includes acquiring a plurality of images corresponding to at least one field of view using an imaging device having an objective and a stage for holding a sample to be imaged. Furthermore, the method includes determining a figure of merit corresponding to each pixel in each of the plurality of acquired images, wherein the figure of merit comprises a discrete approximation to a gradient vector. The method also includes synthesizing a composite image based upon the determined figures of merit.

32 Claims, 7 Drawing Sheets

SYSTEM AND METHOD FOR IMAGING WITH ENHANCED DEPTH OF FIELD

BACKGROUND

Embodiments of the present invention relate to imaging, and more particularly to construction of an image with an enhanced depth of field.

Prevention, monitoring and treatment of physiological conditions such as cancer, infectious diseases and other disorders call for the timely diagnosis of these physiological conditions. Generally, a biological specimen from a patient is used for the analysis and identification of the disease. Microscopic analysis is a widely used technique in the analysis and evaluation of these samples. More specifically, the samples may be studied to detect presence of abnormal numbers or types of cells and/or organisms that may be indicative of a disease state. Automated microscopic analysis systems have been developed to facilitate speedy analysis of these samples and have the advantage of accuracy over manual analysis in which technicians may experience fatigue over time leading to inaccurate reading of the sample. Typically, samples on a slide are loaded onto a microscope. A lens or objective of the microscope may be focused onto a particular area of the sample. The sample is then scanned for one or more objects of interest. It may be noted that it is of paramount importance to properly focus the sample/objective to facilitate acquisition of images of high quality.

Digital optical microscopes are used to observe a wide variety of samples. A depth of field is defined as a measurement of a range of depth along a view axis corresponding to the in-focus portion of a three-dimensional (3D) scene being imaged to an image plane by a lens system. Images acquired via use of digital microscopes are typically acquired at high numerical apertures. The images obtained at the high numerical apertures are generally highly sensitive to a distance from a sample to an objective lens. Even a deviation of a few microns may be enough to throw a sample out of focus. Additionally, even within a single field of view of the microscope, it may not be possible to bring an entire sample into focus at one time merely by adjusting the optics.

Moreover, this problem is further exacerbated in the case of a scanning microscope, where the image to be acquired is synthesized from multiple fields of view. In addition to variations in the sample, the microscope slide has variations in its surface topography. The mechanism for translating the slide in a plane normal to the optical axis of the microscope may also introduce imperfections in image quality while raising, lowering and tiling the slide, thereby leading to imperfect focus in the acquired image. Additionally, the problem of imperfect focus is further aggravated in an event that a sample disposed on a slide is not substantially flat within a single field of view of the microscope. Specifically, these samples disposed on the slide may have significant amounts of material that is out of a plane of the slide.

A number of techniques have been developed for imaging that address problems associated with imaging a sample that has significant amounts of material out of plane. These techniques generally entail capturing entire fields of view of the microscope and stitching them together. However, use of these techniques results in inadequate focus when the depth of the sample varies significantly within a single field of view. Confocal microscopy has been employed to obtain depth information of a three-dimensional (3D) microscopic scene. However, these systems tend to be complex and expensive. Also, since confocal microscopy is typically limited to imaging of microscopic specimens, they are generally not practical for imaging macroscopic scenes.

Certain other techniques address the problem of automatic focusing when the depth of the sample varies significantly within a single field of view by acquiring and retaining images at multiple planes of focus. While these techniques provide images that are familiar to an operator of the microscope, these techniques require retention of 3-4 times the amount of data, and may well be cost-prohibitive for a high-throughput instrument.

In addition, certain other currently available techniques involve dividing an image into fixed areas and choosing the source image based on the contrast achieved in those areas. Unfortunately, use of these techniques introduces objectionable artifacts in the generated images. Moreover, these techniques tend to produce images of limited focus quality especially when confronted with samples disposed on a slide are not substantially flat within a single field of view, thereby limiting use of these microscopes in the pathology lab to diagnose abnormalities in such samples, particularly where the diagnosis requires high magnification (as with bone marrow aspirates).

It may therefore be desirable to develop a robust technique and system configured to construct an image with an enhanced depth of field that advantageously enhances image quality. Moreover, there is a need for a system that is configured to accurately image samples that have significant material out of a plane of the slide.

BRIEF DESCRIPTION

In accordance with aspects of the present technique, a method for imaging is presented. The method includes acquiring a plurality of images corresponding to at least one field of view using an imaging device having an objective and a stage for holding a sample to be imaged. Furthermore, the method includes determining a figure of merit corresponding to each pixel in each of the plurality of acquired images, wherein the figure of merit comprises a discrete approximation to a gradient vector. The method also includes synthesizing a composite image based upon the determined figures of merit.

In accordance with another aspect of the present technique, an imaging device is presented. The device includes an objective lens. Moreover, the device includes a primary image sensor configured to generate a plurality of images of a sample. Additionally, the device includes a controller configured to adjust a sample distance between the objective lens and the sample along an optical axis to image the sample. The device also includes a scanning stage to support the sample and move the sample in at least a lateral direction that is substantially orthogonal to the optical axis. Moreover, the device includes a processing subsystem to acquire a plurality of images corresponding to at least one field of view, determine a figure of merit corresponding to each pixel in each of the plurality of acquired images, wherein the figure of merit comprises a discrete approximation to a gradient vector, and synthesize a composite image based upon the determined figures of merit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As will be described in detail hereinafter, a method and system for imaging a sample, such as a sample that has significant material out of a plane of a slide, while enhancing image quality and optimizing scanning speed are presented. By employing the method and device described hereinafter, enhanced image quality and substantially increased scanning speed may be obtained, while simplifying the clinical workflow of sample scanning Although, the exemplary embodiments illustrated hereinafter are described in the context of a digital microscope, it will be appreciated that use of the imaging device in other applications, such as, but not limited to, a telescope, a camera, or a medical scanner such as an X-ray computed tomography (CT) imaging system, are also contemplated in conjunction with the present technique.

Figure 1:
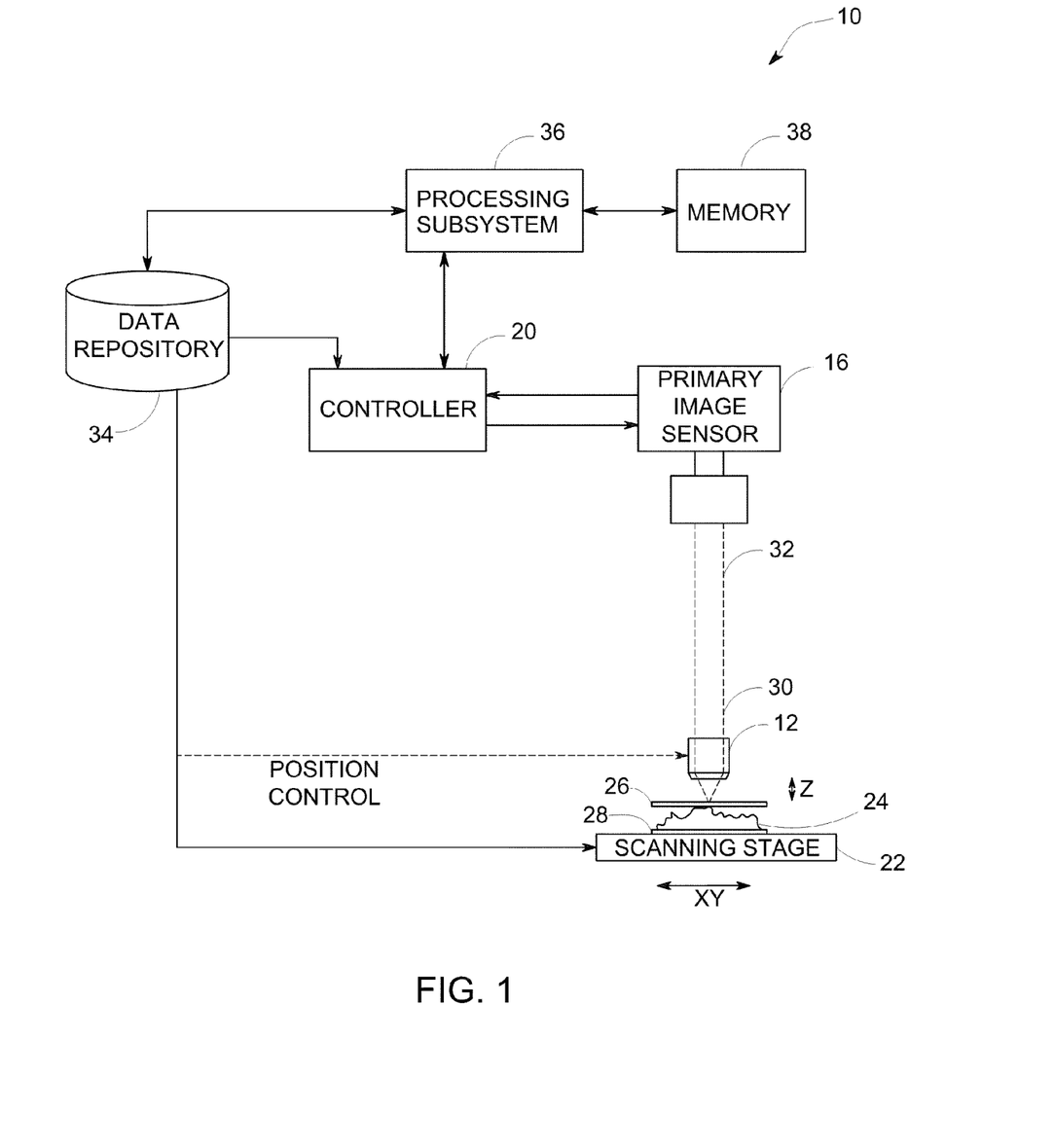
FIG. 1 is a block diagram of an imaging device, such as a digital optical microscope, that incorporates aspects of the present technique.

FIG. 1 illustrates one embodiment of an imaging device 10, such as a digital optical microscope, that incorporates aspects of the present invention. The imaging device 10 includes an objective lens 12, a primary image sensor 16, a controller 20 and a scanning stage 22. In the illustrated embodiment, a sample 24 is disposed between a cover slip 26 and a slide 28, and the sample 24, the cover slip 26 and the slide 28 are supported by the scanning stage 22. The cover slip 26 and the slide 28 may be made of a transparent material such as glass, while the sample 24 may represent a wide variety of objects or samples including biological samples. For example, the sample 24 may represent industrial objects such as integrated circuit chips or microelectromechanical systems (MEMS), and biological samples such as biopsy tissue including liver or kidney cells. In a non-limiting example, such samples may have a thickness that averages from about 5 microns to about 7 microns and varies by several microns and may have a lateral surface area of approximately 15×15 millimeters. More particularly, these samples may have substantial material out of a plane of the slide 28.

The objective lens 12 is spaced from the sample 24 by a sample distance that extends along an optical axis in the Z (vertical) direction, and the objective lens 12 has a focal plane in the X-Y plane (lateral or horizontal direction) that is substantially orthogonal to the Z or vertical direction. The objective lens 12 collects light 30 radiated from the sample 24 at a particular field of view, magnifies the light 30 and directs the light 30 to the primary image sensor 16. The objective lens 12 may vary in magnification power depending, for example, upon the application and size of the sample features to be imaged. By way of a non-limiting example, in one embodiment, the objective lens 12 may be a high power objective lens providing a 20× or greater magnification and a having a numerical aperture of 0.5 or greater than 0.5 (small depth of focus). The objective lens 12 may be spaced from the sample 24 by a sample distance ranging from about 200 microns to about a few millimeters depending on the designed working distance of the objective 12 and may collect light 30 from a field of view of 750×750 microns, for example, in the focal plane. However, the working distance, field of view and focal plane may also vary depending upon the microscope configuration or characteristics of the sample 24 to be imaged. Moreover, in one embodiment, the objective lens 12 may be coupled to a position controller, such as a piezo actuator to provide fine motor control and rapid small field of view adjustment to the objective 12.

In one embodiment, the primary image sensor 16 may generate one or more images of the sample 24 corresponding to at least one field of view using, for example, a primary light path 32. The primary image sensor 16 may represent any digital imaging device such as a commercially available charge-coupled device (CCD) based image sensor.

Furthermore, the imaging device 10 may illuminate the sample 24 using a wide variety of imaging modes including bright field, phase contrast, differential interference contrast and fluorescence. Thus, the light 30 may be transmitted or reflected from the sample 24 using bright field, phase contrast or differential interference contrast, or the light 30 may be emitted from the sample 24 (fluorescently labeled or intrinsic) using fluorescence. In addition, the light 30 may be generated using trans-illumination (where the light source and the objective lens 12 are on opposite sides of the sample 24) or epi-illumination (where the light source and the objective lens 12 are on the same side of the sample 24). As such, the imaging device 10 may further include a light source (such as a high intensity LED or a mercury or xenon arc or metal halide lamp) which has been omitted from the figures for convenience of illustration.

Moreover, in one embodiment, the imaging device 10 may be a high-speed imaging device configured to rapidly capture a large number of primary digital images of the sample 24 where each primary image represents a snapshot of the sample 24 at a particular field of view. In certain embodiments, the particular field of view may be representative of only a fraction of the entire sample 24. Each of the primary digital images may then be digitally combined or stitched together to form a digital representation of the entire sample 24.

As previously noted, the primary image sensor 16 may generate a large number of images of the sample 24 corresponding to at least one field of view using the primary light path 32. However, in certain other embodiments, the primary image sensor 16 may generate a large number of images of the sample 24 corresponding to multiple overlapping fields of view using the primary light path 32. In one embodiment, the imaging device 10 captures and utilizes these images of the sample 24 obtained at varying sample distances to generate a composite image of the sample 24 with enhanced depth of field. Moreover, in one embodiment, the controller 20 may adjust the distance between the objective lens 12 and the sample 24 to facilitate acquisition of a plurality of images associated with at least one field of view. Also, in one embodiment, the imaging device 10 may store the plurality of acquired images in a data repository 34 and/or memory 38.

In accordance with aspects of the present technique, the imaging device 10 may also include an exemplary processing subsystem 36 for imaging a sample, such as the sample 24 having material out of the plane of the slide 28. Particularly, the processing subsystem 36 may be configured to determine a figure of merit corresponding to each pixel in each of the plurality of acquired images. The processing subsystem 36 may also be configured to synthesize a composite image based upon the determined figures of merit. The working of the processing subsystem 36 will be described in greater detail with reference to FIGS. 5-9. In the presently contemplated configuration although the memory 38 is shown as being separate from the processing subsystem 36, in certain embodiments, the processing subsystem 36 may include the memory 38. Additionally, although the presently contemplated configuration depicts the processing subsystem 36 as being separate from the controller 20, in certain embodiments, the processing subsystem 36 may be combined with the controller 20.

Fine focus is generally achieved by adjusting the position of the objective 12 in the Z-direction by means of an actuator. Specifically, the actuator is configured to move the objective 12 in a direction that is substantially perpendicular to the plane of the slide 28. In one embodiment, the actuator may include a piezoelectric transducer for high speed of acquisition. In certain other embodiments, the actuator may include a rack and pinion mechanism having a motor and reduction drive for high range of motion.

Figure 2:
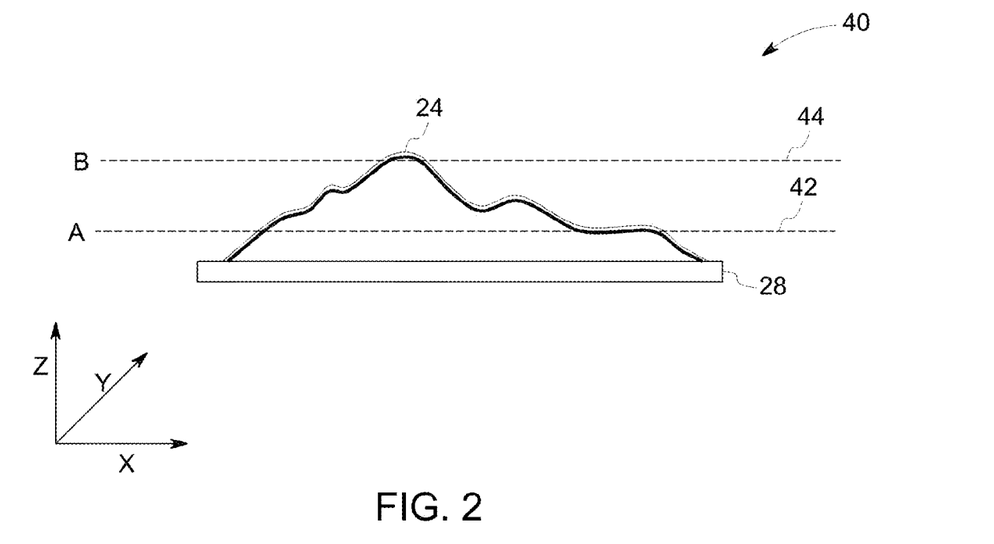
FIG. 2 is a diagrammatic illustration of a sample that has significant material out of plane disposed on a slide.

It may be noted that a problem of imaging generally arises in the event that the sample 24 disposed on the slide 28 is not flat within a single field of view of the microscope. Particularly, the sample 24 may have material that is out of a plane of the slide 28, thereby resulting in a poorly focused image. Referring now to FIG. 2, a diagrammatic illustration 40 of the slide 28 and the sample 24 disposed thereon is depicted. As depicted in FIG. 2, in certain situations, the sample 24 disposed on the slide 28 may not be flat. By way of example, when the sample 24 is dematerialized, the material of the sample 24 expands thereby rendering the sample to have material that is out of a plane of the slide 28 within a single field of view of the microscope. Consequently, certain areas of the sample may be out of focus for a given sample distance. Accordingly, if the objective 12 is focused at a first sample distance with respect to the sample 24, such as at a lower imaging plane A 42, then the center of the sample 24 will be out of focus. Conversely, if the objective 12 is focused at a second sample distance, such as at an upper imaging plane B 44, then the edges of the sample 24 will be out of focus. More particularly, there may be no compromise sample distance where the entire sample 24 is in acceptable focus. The term "sample distance" is used hereinafter to refer to the separation distance between the objective lens 12 and the sample 24 to be imaged. Also, the terms "sample distance" and "focal distance" may be used interchangeably.

In accordance with exemplary aspects of the present technique, the imaging device 10 may be configured to enhance a depth of field thereby allowing samples that have substantial surface topography to be accurately imaged. To this end, the imaging device 10 may be configured to acquire a plurality of images corresponding to at least one field of view while the objective 12 is positioned at a series of sample distances from the sample 24, determine a figure of merit corresponding to each pixel in the plurality of images and synthesize a composite image based upon the determined figures of merit.

Accordingly, in one embodiment, a plurality of images may be acquired by positioning the objective 12 at a plurality of corresponding sample distances (Z-heights) from the sample 24, while the scanning stage 22 and the sample 24 remain at a fixed X-Y position. In certain other embodiments, the plurality of images may be acquired by moving the objective lens 12 in the Z-direction and the scanning stage 22 (and the sample 24) in the X-Y direction.

Figure 3:
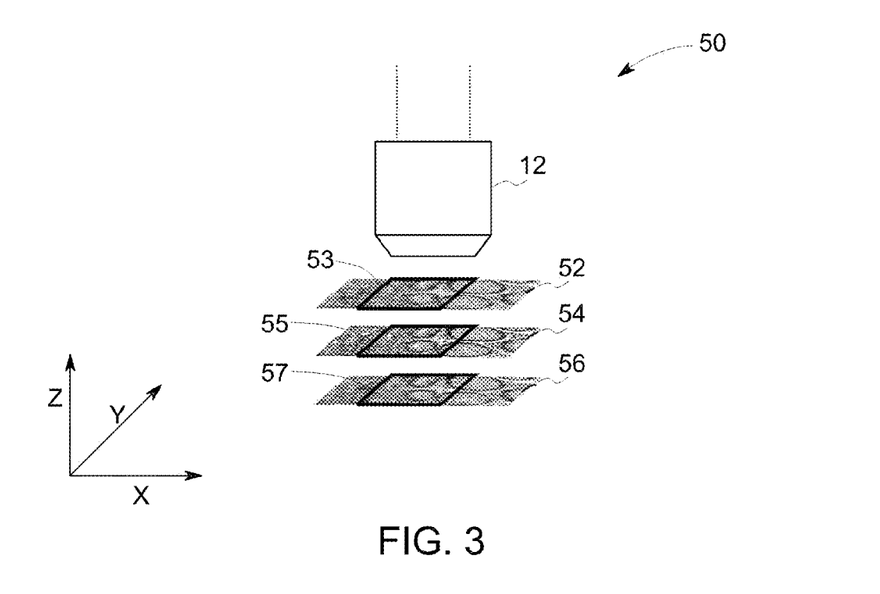
FIGS. 3-4 are diagrammatic illustrations of acquisition of a plurality of images, in accordance with aspects of the present technique.

FIG. 3 is a diagrammatic illustration 50 of a method of acquisition of the plurality of images by positioning the objective 12 at a plurality of corresponding sample distances (Z-heights) from the sample 24, while the scanning stage 22 and the sample 24 remain at a fixed X-Y position. Specifically, the plurality of images corresponding to a single field of view may be acquired by positioning the objective 12 at a plurality of sample distances with respect to the sample 24. As used herein, the term "field of view" is used to refer an area of the slide 28 from which light arrives on a working surface of the primary image sensor 16. Reference numerals 52, 54, and 56 are respectively representative of a first image, a second image, and a third image obtained by respectively positioning the objective 12 at a first sample distance, a second sample distance and a third sample distance with respect to the sample 24. Also, reference numeral 53 is representative of a portion of the first image 52 corresponding to a single field of view of the objective 12. Similarly, reference numeral 55 is representative of a portion of the second image 54 corresponding to a single field of view of the objective 12. Moreover, reference numeral 57 is representative of a portion of the third image 52 corresponding to a single field of view of the objective 12.

By way of example, the imaging device 10 may capture the first image 52, the second image 54 and the third image 56 of the sample 24 using the primary image sensor 16 while the objective 12 is respectively positioned at first, second and third sample distances with respect to the sample 24. The controller 20 or the actuator may displace the objective lens 12 in a first direction. In one embodiment, the first direction may include a Z-direction. Accordingly, the controller 20 may displace or vertically shift the objective lens 12 relative to the sample 24 in the Z-direction to obtain the plurality of images at multiple sample distances. In the example illustrated in FIG. 3, the controller 20 may vertically shift the objective lens 12 relative to the sample 24 in the Z-direction while maintaining the scanning stage 22 at a fixed X-Y position to obtain the plurality of images 52, 54, 56 at multiple sample distances, where the plurality of images 52, 54, 56 correspond to a single field of view. Alternatively, the controller 20 may vertically shift the scanning stage 22 and the sample 24 while the objective lens 12 remains at a fixed vertical position, or the controller 20 may vertically shift both the scanning stage 22 (and the sample 24) and the objective lens 12. The images so acquired may be stored in the memory 38 (see FIG. 1). Alternatively, the images may be stored in the data repository 34 (see FIG. 1).

Figure 4:
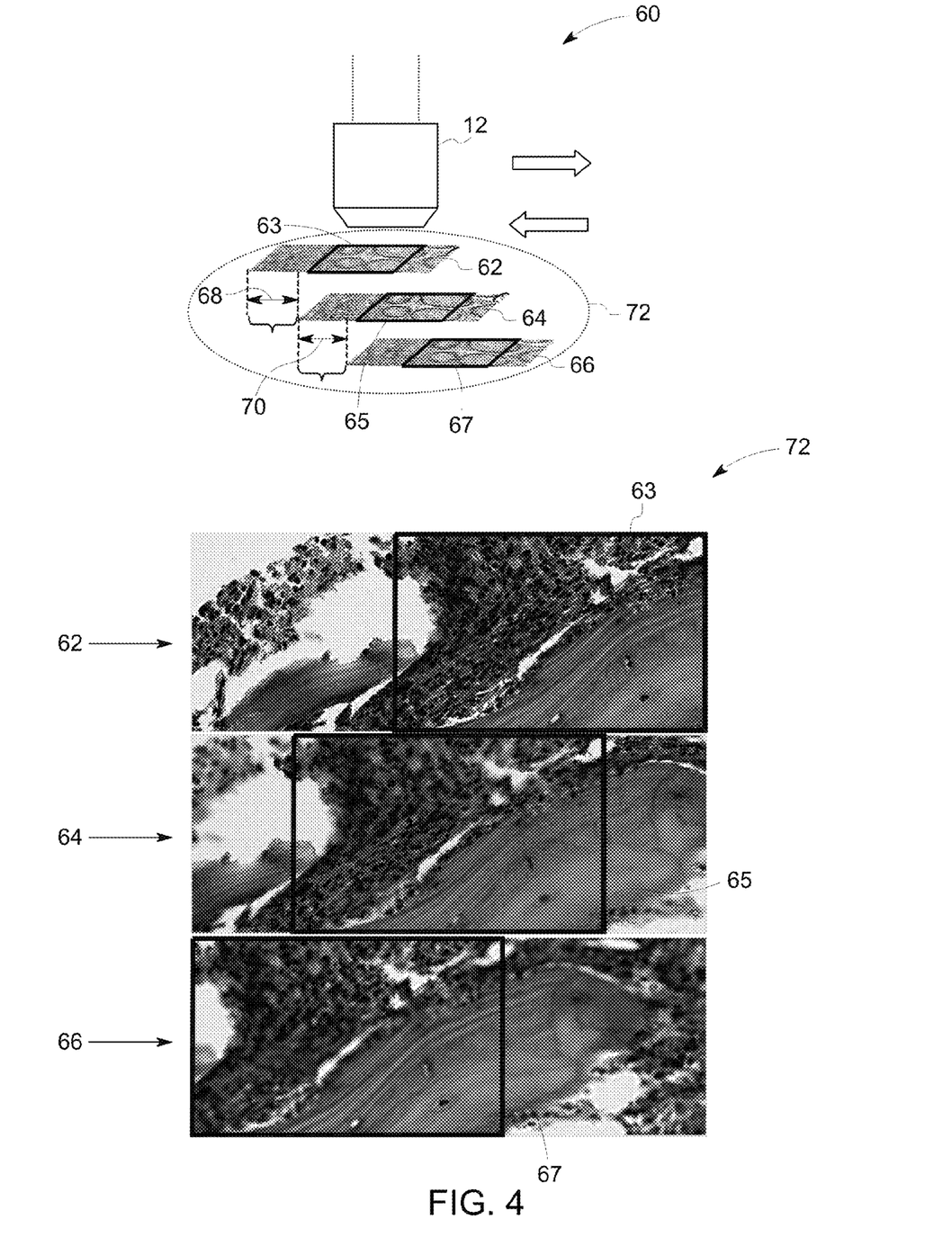

In accordance with further aspects of the present technique, a plurality of images corresponding multiple fields of view may be acquired. Specifically, a plurality of images corresponding to overlapping fields of view may be acquired. Turning now to FIG. 4, a diagrammatic illustration 60 of the acquisition of the plurality of images while the objective lens 12 is moved in the first direction (Z-direction) and the scanning stage 22 (and the sample 24) are moved in a second direction is depicted. It may be noted that in certain embodiments, the second direction may be substantially orthogonal to the first direction. Also, in one embodiment, the second direction may include the X-Y direction. More particularly, the acquisition of a plurality of images corresponding to multiple overlapping fields of view is depicted. Reference numerals 62, 64, and 66 are respectively representative of a first image, a second image, and a third image obtained by respectively positioning the objective 12 at a first sample distance, a second sample distance and a third sample distance with respect to the sample 24 while the scanning stage 22 is moved in the X-Y direction.

It may be noted that the field of view of the objective 12 shifts with the motion of the scanning stage 22 in the X-Y direction. In accordance with aspects of the present technique, a substantially similar region across the plurality of acquired images may be evaluated. Accordingly, a region that shifts in synchrony with the motion of the scanning stage 22 may be selected such that the same region is evaluated at each sample distance. Reference numerals 63, 65 and 67 may respectively be representative of a region that shifts in synchrony with the motion of the scanning stage 22 in the first image 62, the second image 64 and the third image 66.

In the example illustrated in FIG. 4, the controller 20 may vertically shift the objective lens 12 while also moving the scanning stage 22 (and the sample 24) in the X-Y direction to facilitate acquisition of images corresponding to overlapping fields of view at different sample distances such that every portion of every field of view is acquired at different sample distances. Specifically, the plurality of images 62, 64 and 66 may be acquired such that for any given X-Y location of the scanning stage 22, there is a substantial overlap across the plurality of images 62, 64 and 66. Accordingly, in one embodiment, the sample 24 may be scanned beyond a region of interest and image data corresponding to regions that have no overlap across the image planes may subsequently be discarded. These images may be stored in the memory 38. Alternatively, these acquired images may be stored in the data repository 34.

Referring again to FIG. 1, in accordance with exemplary aspects of the present technique, once the plurality of images corresponding to at least one field of view are acquired, the imaging device 10 may determine a quantitative characteristic for the respective plurality of acquired images of the sample 24 captured at multiple sample distances. A quantitative characteristic represents a quantitative measure of image quality and may also be referred to as a figure of merit. In one embodiment, the figure of merit may include a discrete approximation of a gradient vector. More particularly, in one embodiment, the figure of merit may include a discrete approximation of a gradient vector of an intensity of a green channel with respect to a spatial position of the green channel. Accordingly, in certain embodiments, the imaging device 10, and more particularly the processing subsystem 36 may be configured to determine a figure of merit in the form of a discrete approximation to a gradient vector of an intensity of a green channel with respect to a spatial position of the green channel for each pixel in each of the plurality of acquired images. In certain embodiments, a low pass filter may be applied to the gradients to smooth out any noise during the computation of the gradients. It may be noted that although the figure of merit is described as a discrete approximation of a gradient vector of an intensity of a green channel with respect to a spatial position of the green channel, use of other figures of merit, such as, but not limited to, a Laplacian filter, a Sobel filter, a Canny edge detector, or an estimate of local image contrast are also contemplated in conjunction with the present technique.

Each acquired image may be processed by the imaging device 10 to extract information regarding a quality of focus by determining a figure of merit corresponding to each pixel in the image. More particularly, the processing subsystem 36 may be configured to determine a figure of merit corresponding to each pixel in each of the plurality of acquired images. As previously alluded to, in certain embodiments, the figure of merit corresponding to each pixel may include a discrete approximation to a gradient vector. Specifically, in one embodiment, the figure of merit may include a discrete approximation to the gradient vector of an intensity of a green channel with respect to a spatial position of the green channel. Alternatively, the figure of merit may include a Laplacian filter, a Sobel filter, a Canny edge detector, or an estimate of local image contrast.

Subsequently, in accordance with aspects of the present technique, for each pixel in each acquired image, the processing subsystem 36 may be configured to locate an image in the plurality of images that yields the best figure of merit corresponding to that pixel across the plurality of acquired images. As used herein, the term "best figure of merit" may be used to refer to a figure of merit that yields the best quality of focus at a spatial location. Furthermore, for each pixel in each image, the processing subsystem 36 may be configured to assign a first value to that pixel if the corresponding image yields the best figure of merit. Additionally, the processing subsystem 36 may also be configured to assign a second value to a pixel if another image in the plurality of images yields the best figure of merit. In certain embodiments, the first value may be a "1", while a second value may be a "0". These assigned values may be stored in the data repository 34 and/or the memory 38.

In accordance with further aspects of the present aspects, the processing subsystem 36 may also be configured to synthesize a composite image based upon the determined figures of merit. More particularly, the composite image may be synthesized based upon the values assigned to the pixels. In one embodiment, these assigned values may be stored in the form of arrays. It may be noted that although the present technique describes use of arrays to store the assigned values, other techniques for storing the assigned values are also envisaged. Accordingly, the processing subsystem 36 may be configured to generate an array corresponding to each of the plurality of acquired images. Also, in one embodiment, these arrays may have a size that is substantially similar to a size of a corresponding acquired image.

Once these arrays are generated, each element in each array may be populated. In accordance with aspects of the present technique, the elements in the arrays may be populated based upon the figure of merit corresponding to that pixel. More particularly, if a pixel in an image was assigned a first value, then the corresponding element in the corresponding array may be assigned a first value. In a similar fashion, an element in the array corresponding to a pixel may be assigned a second value if that pixel in a corresponding image was assigned a second value. The processing subsystem 36 may be configured to populate all the arrays based on the values assigned to the pixels in the acquired images. Consequent to this processing, a set of populated arrays may be generated. The populated arrays may also be stored in the data repository 34 and/or the memory 38, for example.

In certain embodiments, the processing subsystem 36 may also process the set of populated arrays via a bit mask to generate bit masked filtered arrays. By way of example, processing the populated arrays via the bit masked filter may facilitate generation of bit masked filtered arrays that only include elements having the first value.

Additionally, the processing subsystem 36 may select pixels from each of the plurality of acquired images based on the bit masked filtered arrays. Specifically, in one embodiment, pixels in the acquired images corresponding to elements in an associated bit masked filtered array having the first value may be selected. Furthermore, the processing subsystem 36 may blend the acquired images using the selected pixels to generate a composite image. However, such a blending of the plurality of acquired images may result in undesirable blending artifacts in the composite image. In certain embodiments, the undesirable blending artifacts may include the formation of bands, such as Mach bands in the composite image.

In accordance with aspects of the present technique, the undesirable blending artifacts in the form of banding may be substantially minimized by smoothing out the transitions from one image to the next by applying a filter to the bit masked filtered arrays. More particularly, in accordance with aspects of the present technique, the banding may be substantially minimized by use of a bicubic low pass filter to smooth out the transitions from one image to the next. Processing the bit masked filtered arrays via the bicubic filter results in the generation of a filtered output. In certain embodiments, the filtered output may include bicubic filtered arrays corresponding to the plurality of images. The processing subsystem 36 may then be configured to use this filtered output as an alpha channel to blend the images together to generate a composite image. Particularly, in alpha blending, a weight generally in a range from about 0 to about 1 may be assigned to each pixel in each of the plurality of images. This assigned weight may generally be designated as alpha ($\alpha$). Specifically, each pixel in a final composite image may be computed by summing the products of the pixel values in the acquired images and their corresponding alpha values and dividing the sum by a sum of the alpha values. In one embodiment, the each pixel ($R_C, G_C, B_C$) in composite image may be computed as:

$$(R_C, G_C, B_C) = \begin{bmatrix} \frac{\alpha_1 R_1 + \alpha_2 R_2 + \ldots + \alpha_n R_n}{\alpha_1 + \alpha_2 + \ldots + \alpha_n}, & \frac{\alpha_1 G_1 + \alpha_2 G_2 + \ldots + \alpha_n G_n}{\alpha_1 + \alpha_2 + \ldots + \alpha_n}, \\ \frac{\alpha_1 B_1 + \alpha_2 B_2 + \ldots + \alpha_n B_n}{\alpha_1 + \alpha_2 + \ldots + \alpha_n} \end{bmatrix} \quad (1)$$

where n may be representative of a number of pixels in the plurality of acquired images, ($\alpha_1, \alpha_2, \ldots \alpha_n$) may be correspondingly representative of the weights assigned to each pixel in the plurality of acquired images ($R_1, R_2, \ldots R_n$) may be representative of the red values of the pixels in the plurality of acquired images, ($G_1, G_2, \ldots G_n$) may be representative of the green values of the pixels in the plurality of acquired images, and ($B_1, B_2, \ldots B_n$) may be representative of the blue values of the pixels in the plurality of acquired images.

Accordingly, each selected pixel may be blended together as a weighted average of the corresponding pixels across the plurality of images based upon the filtered output to generate a composite image having an enhanced depth of field.

In accordance with further aspects of the present technique, the imaging device 10 may be configured to acquire the plurality of images. In one embodiment, the plurality of images of the sample 24 may be acquired by positioning the objective 12 at a plurality of sample distances (Z-heights), while the scanning stage 22 is held fixed at a discrete X-Y location. Particularly, acquiring the plurality of images corresponding to at least one field of view may include positioning the objective 12 at the plurality of sample distances by displacing the objective 12 along the Z-direction, while the scanning stage 22 is held at a fixed discrete location along the X-Y direction. Accordingly, corresponding pluralities of images of the sample 24 may be acquired by positioning the objective 12 at the plurality of sample distances (Z-heights), while the scanning stage 22 is held fixed at a series of discrete X-Y locations. Specifically, the corresponding sets of images may be acquired by positioning the objective 12 at the plurality of sample distances by displacing the objective 12 along the Z-direction while the scanning stage 22 is positioned at a series of discrete locations along the X-Y direction. It may be noted that the scanning stage 22 may be positioned at the series of discrete X-Y locations by translating the scanning stage in the X-Y direction.

In another embodiment, a plurality of overlapping images may be acquired by moving the objective 12 along the Z-direction while the scanning stage 22 is simultaneously translated in the X-Y direction. These overlapping images may be acquired such that the overlapping images cover all the X-Y locations at each possible Z-height.

Subsequently, the processing subsystem 36 may be configured to determine figures of merit corresponding to each pixel in each of the plurality of acquired images. Furthermore, in accordance with aspects of the present technique, the figure of merit may include a discrete approximation of a gradient vector. Specifically, in certain embodiments, the figure of merit may include a discrete approximation of a gradient vector. More particularly, in one embodiment, the figure of merit may include a discrete approximation of a gradient vector of an intensity of a green channel with respect to a spatial position of the green channel. A composite image may then be synthesized based upon the determined figures of merit by the processing subsystem 36, as previously described with respect to FIG. 1.

As previously noted, blending the plurality of acquired images may result in the formation of bands in the composite image due to pixels being selected from different images and thereby resulting in abrupt transitions from one image to another. In accordance with aspects of the present technique, the plurality of acquired images may be processed via use of a bicubic filter. Processing the plurality of acquired images via use of the bicubic filter smoothens any abrupt transitions from one image to another, thereby minimizing any banding in the composite image.

Figure 5:
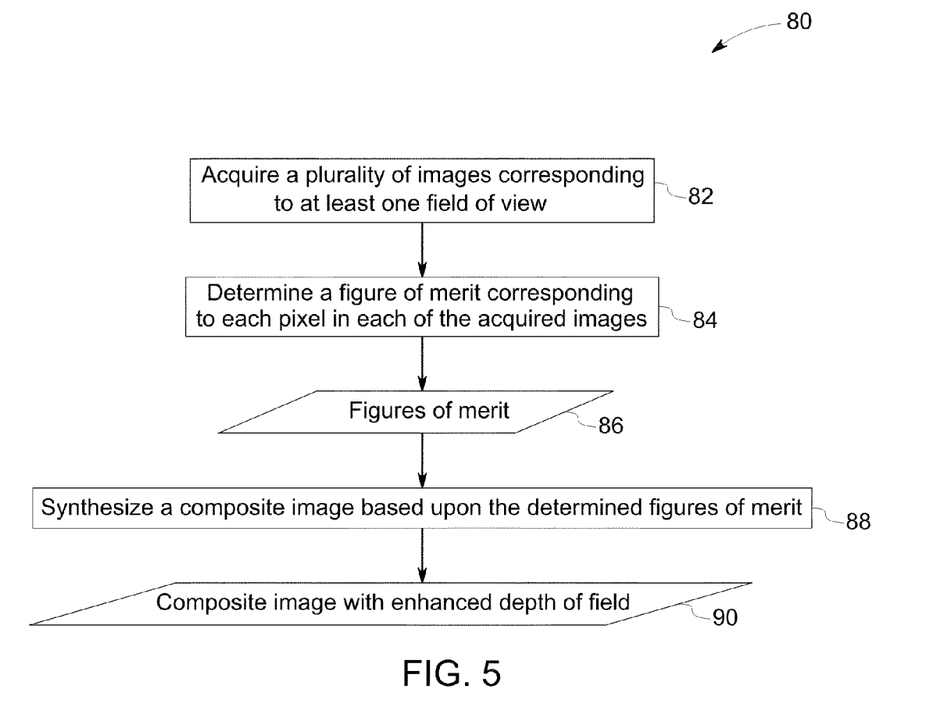
FIG. 5 is a flow chart illustrating an exemplary process of imaging a sample such as the sample illustrated in FIG. 2, in accordance with aspects of the present technique.

Turning now to FIG. 5, a flow chart 80 illustrating an exemplary method for imaging a sample is depicted. More particularly, a method for imaging a sample that has a substantial portion of material out of a plane of a slide is presented. The method 80 may be described in a general context of computer executable instructions. Generally, computer executable instructions may include routines, programs, objects, components, data structures, procedures, modules, functions, and the like that perform particular functions or implement particular abstract data types. In certain embodiments, the computer executable instructions may be located in computer storage media, such as the memory 38 (see FIG. 1), local to the imaging device 10 (see FIG. 1) and in operative association with the processing subsystem 36. In certain other embodiments, the computer executable instructions may be located in computer storage media, such as memory storage devices, that are removed from the imaging device 10 (see FIG. 1). Moreover, the method of imaging 80 includes a sequence of operations that may be implemented in hardware, software, or combinations thereof.

The method starts at step 82 where a plurality of images associated with at least one field of view may be acquired. More particularly, a slide containing a sample is loaded onto an imaging device. By way of example, the slide 28 with the sample 24 may be loaded onto the scanning stage 22 of the imaging device 10 (see FIG. 1). Subsequently, a plurality of images corresponding at least one field of view may be acquired. In one embodiment, a plurality of images corresponding to a single field of view may be acquired by moving the objective 12 in the Z-direction while the scanning stage 22

(and the sample 24) remain at a fixed X-Y position. By way of example, the plurality of images corresponding to a single field of view may be acquired as described with reference to FIG. 3. Accordingly, at a single field of view, a first image of the sample 24 may be acquired by positioning the objective 12 at a first sample distance (Z-height) with respect to the sample 24. A second image may be obtained by positioning the objective 12 at a second sample distance with respect to the sample 24. In a similar fashion, a plurality of images may be acquired by positioning the objective 12 at corresponding sample distances with respect to the sample 24. In one embodiment, the acquisition of images of step 82 may entail acquisition of 3-5 images of the sample 24. Alternatively, the scanning stage 22 (and the sample 24) may be vertically shifted while the objective lens 12 remains at a fixed vertical position, or both the scanning stage 22 (and the sample 24) and the objective lens 12 may be vertically shifted to acquire the plurality of images corresponding to the single field of view.

However, in certain other embodiments, the plurality of images may be acquired by moving the objective 12 in the Z-direction, while the scanning stage 22 and the sample 24 are moved in the X-Y direction. By way of example, the plurality of images corresponding to multiple fields of view may be acquired as described with reference to FIG. 4. Specifically, the acquisition of the plurality of images corresponding to overlapping fields of view may be spaced substantially close enough such that at least one acquired image covers any location in the image plane for each position (Z-height) of the objective 12. Accordingly, a first image, a second image, and a third image may be acquired by respectively positioning the objective 12 at a first sample distance, a second sample distance and a third sample distance with respect to the sample 24 while the scanning stage 22 is moved in the X-Y direction.

With continuing reference to FIG. 5, once the plurality of images are acquired, a quality characteristic such as a figure of merit corresponding to each pixel in each of the plurality of images may be determined, as indicated by step 84. As previously noted, in accordance with aspects of the present technique, in one embodiment, the figure of merit corresponding to each pixel may be representative of a discrete approximation to a gradient vector. More particularly, in one embodiment, the figure of merit corresponding to each pixel may be representative of a discrete approximation to a gradient vector of an intensity of a green channel with respect to a spatial position of the green channel. In certain other embodiments, the figure of merit may include a Laplacian filter, a Sobel filter, a Canny edge detector, or an estimate of local image contrast, as previously noted. The determination of the figure of merit corresponding to each pixel in each of the plurality of images may be better understood with reference to FIGS. 6-8.

Figure 6:
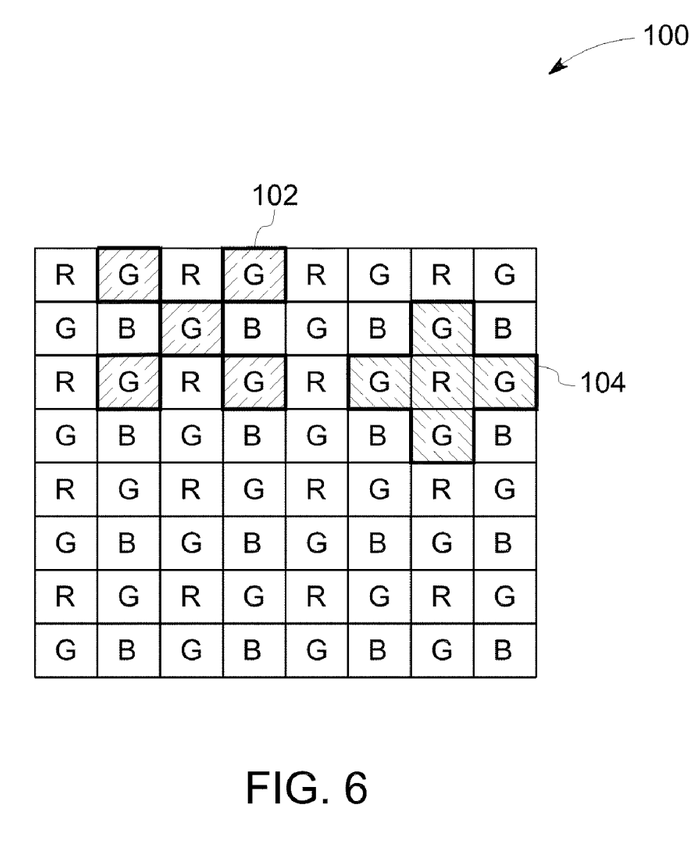
FIG. 6 is a diagrammatic illustration of a portion of an acquired image for use in the process of imaging of FIG. 5, in accordance with aspects of the present technique.

Typically, an image, such as the first image 52 (see FIG. 3), includes an arrangement of red "R", blue "B" and green "G" pixels. FIG. 6 is representative of a portion 100 of an acquired image in the plurality of images. For example, the portion 100 may be representative of a portion of the first image 52. Reference numeral 102 is representative of a first section of the portion 100, while a second section of the portion 100 may generally be represented by reference numeral 104.

Figure 7:
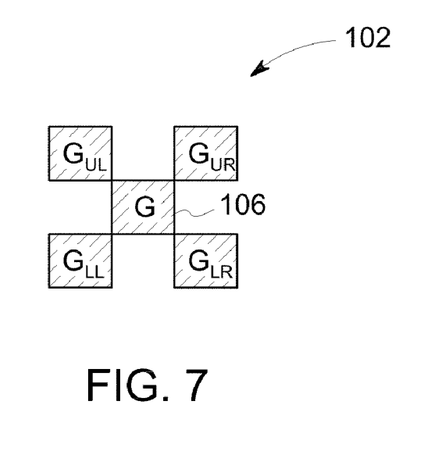
FIGS. 7-8 are diagrammatic illustrations of sections of the portion of the acquired image of FIG. 6, in accordance with aspects of the present technique.

As previously noted, the figure of merit may be representative of a discrete approximation to the gradient vector of an intensity of a green channel with respect to a spatial position of the green channel. FIG. 7 illustrates a diagrammatical representation of the first section 102 of the portion 100 of FIG. 6. Accordingly, as depicted in FIG. 7, a discrete approximation of the gradient vector of a green "G" pixel 106 may be determined as:

$$|\nabla G| \approx \sqrt{\left[\frac{(G_{LR} - G_{UL})\sqrt{2}}{4}\right]^2 + \left[\frac{(G_{LL} - G_{UR})\sqrt{2}}{4}\right]^2} \quad (2)$$

where $G_{LR}$, $G_{LL}$, $G_{UL}$ and $G_{UR}$ are representative of neighboring green "G" pixels of the green "G" pixel 106.

Figure 8:
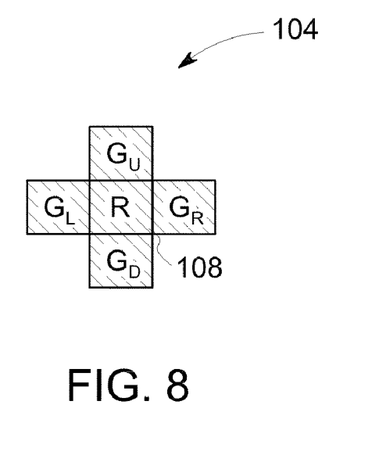

FIG. 8 is representative of the second section 104 of portion 100 of FIG. 6. Accordingly, if a pixel includes a red "R" pixel or a blue "B" pixel, a discrete approximation of the gradient vector of the red "R" pixel 108 (or a blue "B" pixel) may be determined as:

$$|\nabla G| \approx \sqrt{\left[\frac{(G_R - G_L)}{2}\right]^2 + \left[\frac{(G_U - G_D)}{2}\right]^2} \quad (3)$$

where $G_R$, $G_L$, $G_U$ and $G_D$ are representative of neighboring green "G" pixels of the red "R" pixel 106 or a blue "B" pixel.

With returning reference to FIG. 5, at step 84, a figure of merit in the form of a discrete approximation to the gradient vector of the intensity of a green channel corresponding to each pixel in each of the plurality of images may be determined as described with reference to FIGS. 6-8. Reference numeral 86 may generally be representative of the determined figures of merit. In one embodiment, the figures of merit so determined at step 84 may be stored in the data repository 34 (see FIG. 1).

It may be noted that in embodiments that entail acquisition of the plurality of images corresponding to overlapping fields of view, the field of view of the objective 12 shifts with the motion of the scanning stage 22 in the X-Y direction. In accordance with aspects of the present technique, a substantially similar region across the plurality of acquired images may be evaluated. Accordingly, a region that shifts in synchrony with the motion of the scanning stage 22 may be selected such that the same region is evaluated at each sample distance. Following the selection of the regions in the plurality of images, figures of merit corresponding to only the selected regions may be determined such that substantially similar regions are evaluated at each sample distance.

Figure 9A:
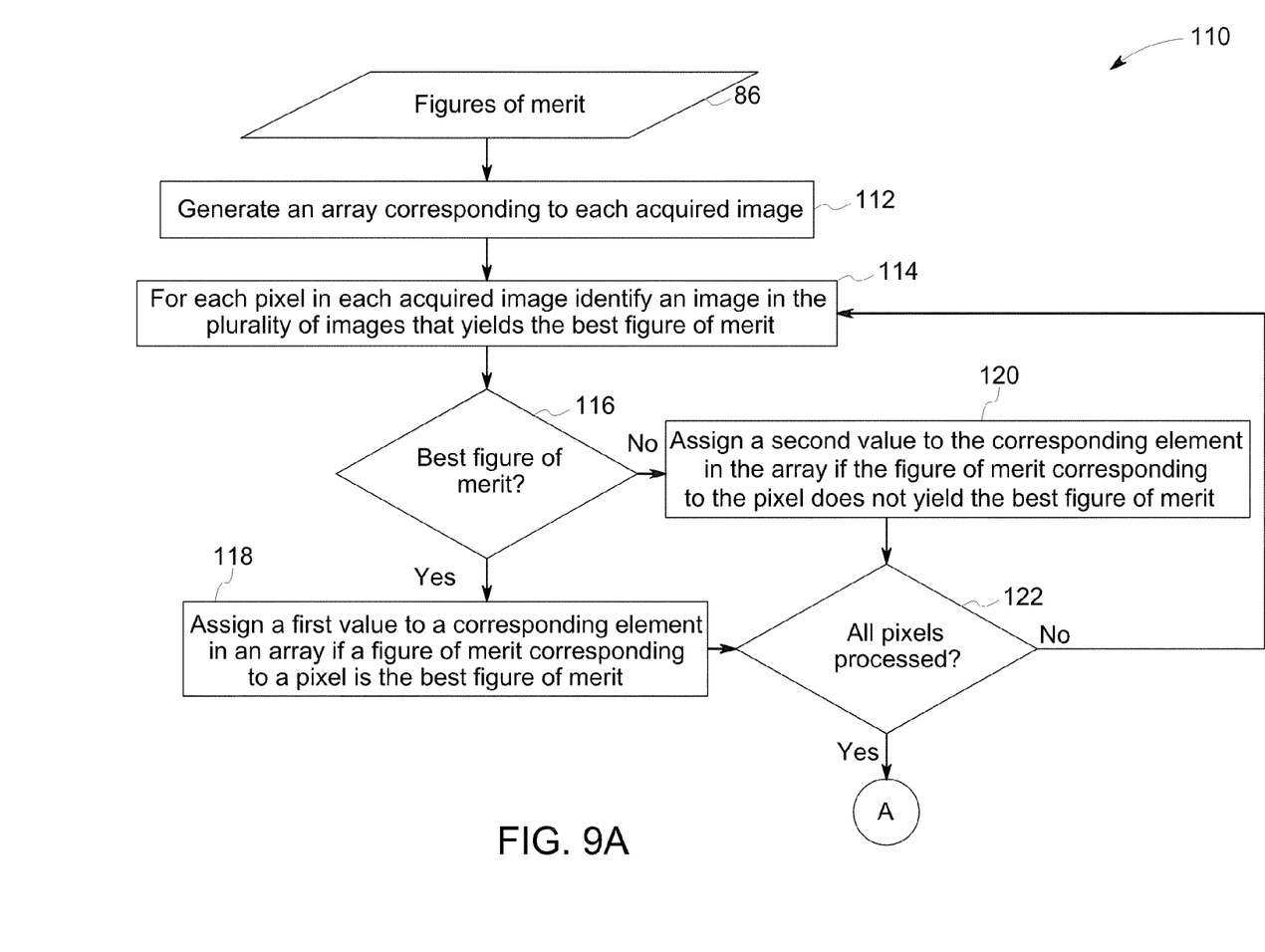
FIGS. 9A-9B are flow charts illustrating a method of synthesizing a composite image, in accordance with aspects of the present technique.
Figure 9B:
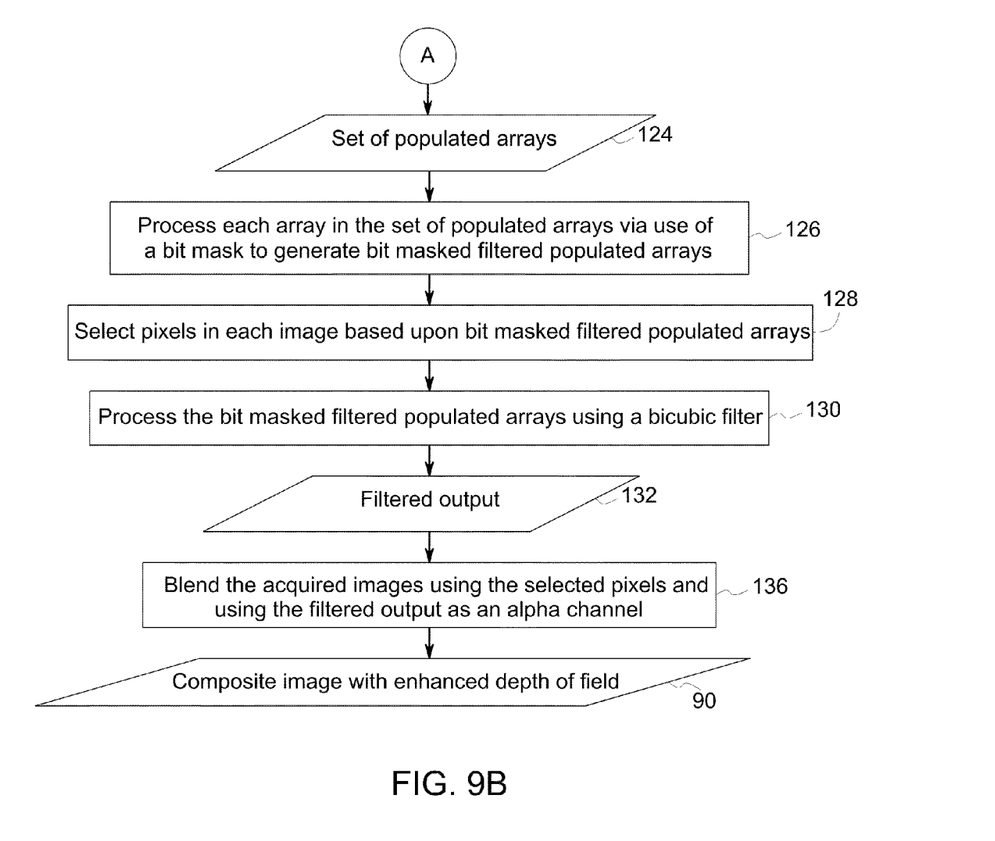

Subsequently, at step 88, in accordance with exemplary aspects of the present technique, a composite image with enhanced depth of field may be synthesized based upon the figures of merit determined at step 84. Step 88 may be better understood with reference to FIG. 9. Turning now to FIGS. 9A-9B a flow chart 110 depicting the synthesis of the composite image based upon the determined figures of merit 86 associated with the pixels in the plurality of images is illustrated. More particularly, step 88 of FIG. 5 is depicted in greater detail in FIGS. 9A-9B.

As previously noted, in one embodiment, a plurality of arrays may be used in the generation of a composite image. According, the method starts at step 112, where an array corresponding to each of the plurality of images may be formed. In certain embodiments, the arrays may be sized such that the each array has a size that is substantially similar to a size of a corresponding image in the plurality of images. By way of example, if each image in the plurality of images has a size of (M×N), then a corresponding array may be formed to have a size of (M×N).

Additionally, at step 114, for each pixel in each of plurality of acquired images, an image in the plurality of images that yields the best figure of merit for that pixel across the corresponding pixels in the plurality of images may be identified. As previously alluded to, the best figure of merit is representative of a figure of merit that yields the best quality of focus at a spatial location. Subsequently, each pixel in each image may be assigned a first value if the corresponding image yields the best figure of merit for that pixel. Additionally, a second value may be assigned to a pixel if another image in the plurality of images yields the best figure of merit. In certain embodiments, the first value may be a "1", while a second value may be a "0". These assigned values may be stored in the data repository 34, in one embodiment.

Furthermore, in accordance with exemplary aspects of the present technique, the arrays generated at step 112 may be populated. Specifically, each array may be populated by assigning a first value or a second value to each element in that array based upon the identified figures of merit. By way of example, a pixel in an image in the plurality of acquired images may be selected. Specifically, a pixel $p_{1,1}$ representative of a first pixel in the first image 52 (see FIG. 3) having (x, y) coordinates of (1, 1) may be selected.

Subsequently, at step 116, a check may be carried out to verify if the figure of merit corresponding to the pixel $p_{1,1}$ the first image 52 is the "best" figure of merit corresponding to all the first pixels in the plurality of images 52, 54, 56 (see FIG. 3). More particularly, at step 116, a check may be carried out to verify if a pixel has a first value or a second value associated with that pixel. At step 116, if it is determined that the image corresponding to the pixel $p_{1,1}$ the best figure of merit and hence has an associated first value, then a corresponding entry in the array associated with the first image 52 may be assigned a first value, as indicated by step 118. In certain embodiments, the first value may be a "1". However, at step 116, it is verified that the first image 52 corresponding to the first pixel $p_{1,1}$ not yield the best figure of merit and hence has an associated second value, then a corresponding entry in the array associated with the first image 52 may be assigned a second value, as indicated by step 120. In certain embodiments, the second value may be a "0". Accordingly, an entry in an array corresponding to a pixel may be assigned a first value if that pixel in a corresponding image yields the best figure of merit across the plurality of images. However, if another image in the plurality of acquired images yields the best figure of merit, then an entry in the array corresponding to that pixel may be assigned a second value.

This process of populating the arrays corresponding to each image in the plurality of images may be repeated until all entries in the arrays are populated. Accordingly, at step 122, a check may be carried out to verify if all pixels in each of the images have been processed. At step 122, if it is verified that all the pixels in each of the plurality of images have been processed, control may be transferred to step 124. However, at step 122, if it is verified that all the pixels in each of the plurality of images have not yet been processed, control may be transferred back to step 114. Consequent to the processing of steps 114-122, a set of populated arrays 124 where each entry has either a first value or a second value may be generated. More particularly, each array in the set of populated arrays includes a first value at spatial locations where an image yields the best figure of merit and a second value where another image yields the best figure of merit. It may be noted that the spatial locations in an image that have an associated first value may be representative of spatial locations that yield the best quality of focus in that image. Similarly, spatial locations in that image that have an associated second value may be representative of spatial locations where another image yields the best quality of focus.

With continuing reference to FIG. 9, a composite image may be synthesized based upon the set of populated arrays 124. In certain embodiments, each of these populated arrays 124 may be processed via use of a bit mask to generate bit masked filtered populated arrays, as indicated by step 126. It may be noted that in certain embodiments step 126 may be an optional step. In one embodiment, these bit masked filtered arrays may only include elements having an associated first value, for example. Subsequently, the bit masked filtered arrays may be used to synthesize a composite image.

In accordance with aspects of the present technique, appropriate pixels may be selected from the plurality of images based upon a corresponding bit masked filtered array, as indicated by step 128. More particularly, pixels in each of acquired images that correspond to entries in the bit masked filtered arrays having an associated first value may be selected. The plurality of acquired images may be blended based upon the selected pixels. It may be noted that selecting pixels as described hereinabove may result in adjacent pixels being picked from images acquired at different sample distances (Z-heights). Consequently, this blending of images based upon the selected pixels may result in undesirable blending artifacts, such as Mach bands, in the blended image due to pixels being picked from images acquired at different sample distances.

In accordance with aspects of the present technique, these undesirable blending artifacts may be substantially minimized via use of a bicubic filter. More particularly, the bit masked filtered arrays may be processed via a bicubic filter prior to blending of the images based upon the selected pixels to facilitate minimization of any banding in the blended image, as indicated by step 130. In one embodiment, the bicubic filter may include a bicubic filter having a symmetrical characteristic such that $$k(s)+k(r-s)=1 \qquad (4)$$

where s is representative of a displacement of a pixel from the center of the filter and r is a constant radius.

It may be noted that the value of the constant radius r may be selected such that the filter provides a smooth appearance to the image, while not resulting in blurring or ghost images. In one embodiment, the constant radius may have a value in a range from about 4 to about 32.

Moreover, in one embodiment, the bicubic filter may have a characteristic represented as:

$$k(s) = \begin{cases} 2\left(\frac{s}{r}\right)^3 - 3\left(\frac{s}{r}\right)^2 + 1, & s \le 1 \\ 0, & s > 1 \end{cases} \qquad (5)$$

where s is the pixel displacement from the center of the filter and r is a constant radius, as previously noted.

It may be noted that the filter characteristic may be rotationally symmetrical. Alternatively, the filter characteristic may be applied independently on the X and Y axes.

Processing the bit masked filtered arrays at step 130 via use of the bicubic filter results in a filtered output 132. In one embodiment, the filtered output 132 may include bicubic filtered arrays. Specifically, processing the bit masked filtered arrays via use of the bicubic filter results in the filtered output 132 where each pixel has a corresponding weight associated with that pixel. In accordance with exemplary aspects of the present technique, this filtered output 132 may be used as an alpha channel to aid in the blending of the plurality of acquired images to generate the composite image 90. More particularly, in the filtered output 132, each pixel in each of the bit masked filtered arrays will have a weight associated with that pixel. By way of example, if a pixel had values 1, 0, 0 across the bit masked filtered arrays, then processing of the bit masked filtered arrays via use of the bicubic filter may result in that pixel having weights 0.8, 0.3, 0.1 across the bicubic filtered arrays in the filtered output 132. Consequently, for a given pixel, the transition across the bicubic filtered arrays is smoother than an abrupt transition of 1 to 0 or 0 to 1 in the corresponding bit masked filtered arrays. In addition, the filtering process via use of the bicubic filter also smoothes out any sharp spatial features and smoothes over spatial uncertainty, thereby facilitating removal of any abrupt transitions from one image to another.

Subsequently, at step 136, the plurality of acquired images may be blended employing the pixels selected at step 128 and using the filtered output 132 as an alpha channel to generate the composite image 90. More particularly, a pixel at each (x, y) location in the composite image 90 may be determined as a weighted average of that pixel across the plurality of images based upon the bicubic filtered arrays in the filtered output 132. Specifically, in accordance with aspects of the present technique and as previously alluded to with reference to FIG. 1, the processing subsystem 36 in the imaging device 10 may be configured to generate the composite image by computing each pixel in the composite image by summing the products of the pixel values corresponding to the selected pixels and their corresponding alpha values and dividing the sum by a sum of the alpha values. For example, in one embodiment, each pixel ($R_C, G_C, B_C$) in a composite image, such as the composite image 90 (see FIG. 5) may be computed via use of equation (1).

Consequent to this processing, the composite image 90 (see FIG. 5) with enhanced depth of field is generated. Specifically, the composite image 90 has a depth of field that is larger than the depth of field of the acquired images as pixels with the best figures of merit across the plurality of images acquired at different sample distances are employed to generate the composite image 90.

Furthermore, the foregoing examples, demonstrations, and process steps such as those that may be performed by the imaging device 10 and/or the processing subsystem 36 may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code may be stored or adapted for storage on one or more tangible, machine readable media, such as on data repository chips, local or remote hard disks, optical disks (that is, CDs or DVDs), memory such as the memory 38 (see FIG. 1) or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository 34 or the memory 38.

The methods for imaging a sample and the imaging device described hereinabove dramatically enhance image quality especially when imaging a sample having substantial material out of a plane of a slide. More particularly, use of the method and system described hereinabove facilitate generation of a composite image with enhanced depth of field. Specifically, the method expands the "depth of field" to accommodate samples that have surface topography by acquiring images with the objective 12 at a series of distances from the sample. Additionally, images may also be acquired by moving the objective 12 along the Z-direction, while the scanning stage 22 and the sample 24 are moved along a X-Y direction. Image quality is then assessed in each of the images over the surface of the image. Pixels are chosen from images acquired over various sample distances corresponding to sample distances that provide the sharpest focus. Additionally, use of the blending function facilitates smooth transitions between one focal depth and another, thereby minimizing formation of/appearance of banding in the composite image. The use of a bicubic filter allows generation of a composite image having an enhanced depth of field using a plurality of images acquired at a corresponding plurality of sample distances. The variation along the depth (Z) axis may be combined with scanning the slide in X and Y directions, thereby resulting in a single large planar image that tracks the depth variations of the sample.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for imaging, comprising:
   acquiring a plurality of images corresponding to at least one field of view using an imaging device having an objective and a stage for holding a sample to be imaged;
   determining a figure of merit corresponding to each pixel in each of the plurality of acquired images, wherein the figure of merit comprises a discrete approximation to a gradient vector; and
   synthesizing a composite image based upon the determined figures of merit.

2. The method of claim 1, wherein the discrete approximation to the gradient vector comprises a discrete approximation to the gradient vector of an intensity of a green channel with respect to a spatial position of the green channel.

3. The method of claim 1, wherein acquiring the plurality of images corresponding to at least one field of view comprises positioning the objective at a plurality of sample distances by displacing the objective along a first direction while the scanning stage is held at a fixed location to acquire a set of images corresponding to the location of the scanning stage.

4. The method of claim 3, further comprising acquiring corresponding sets of images by positioning the scanning stage at a series of locations, wherein positioning the scanning stage at the series of locations comprises translating the scanning stage in a second direction.

5. The method of claim 4, wherein the first direction comprises a Z-direction, and the second direction comprises a X-Y direction.

6. The method of claim 1, wherein acquiring the plurality of images corresponding to the at least one field of view comprises positioning the objective at a plurality of sample distances by displacing the objective along a first direction while the scanning stage is simultaneously moved in a second direction to acquire a set of overlapping images.

7. The method of claim 6, wherein the first direction comprises a Z-direction, and the second direction comprises a X-Y direction.

8. The method of claim 1, wherein synthesizing the composite image comprises for each pixel in each of the plurality of acquired images identifying an image in the plurality of images that yields a best figure of merit for that pixel.

9. The method of claim 8, further comprising assigning a first value to a pixel if an image corresponding to the pixel yields the best figure of merit.

10. The method of claim 9, further comprising assigning a second value to the pixel if a corresponding pixel in another image yields the best figure of merit.

11. The method of claim 10, further comprising generating an array for each image in the plurality of images.

12. The method of claim 11, further comprising populating the arrays based upon the determined best figures of merit to generate a set of populated arrays.

13. The method of claim 12, wherein populating the arrays comprises assigning a first value to a corresponding element in an array associated with a pixel if a figure of merit corresponding to the pixel in one of the plurality of images is determined to be better than each figure of merit corresponding to the pixel in each of the other images.

14. The method of claim 13, further comprising assigning a second value to the corresponding element in the array associated with the pixel if the figure of merit corresponding to the pixel does not yield the best figure of merit across the plurality of images.

15. The method of claim 14, further comprising processing each populated array in the set of populated arrays using a bit mask to generate bit masked filtered arrays.

16. The method of claim 15, wherein the bit masked filtered arrays comprise elements having the first value.

17. The method of claim 16, further comprising selecting pixels from each image in the plurality of images based upon the bit masked filtered arrays.

18. The method of claim 15, further comprising processing the bit masked arrays using a bicubic filter to generate a filtered output.

19. The method of claim 18, further comprising blending the selected pixels as a weighted average of corresponding pixels across the plurality of images based upon the filtered output to generate the composite image having an enhanced depth of field.

20. The method of claim 19, further comprising displaying the composite image on a display.

21. An imaging device, comprising:
an objective lens;
a primary image sensor configured to generate a plurality of images of a sample;
a controller configured to adjust a sample distance between the objective lens and the sample along an optical axis to image the sample;
a scanning stage to support the sample and move the sample in at least a lateral direction that is substantially orthogonal to the optical axis;
a processing subsystem to:
acquire a plurality of images corresponding to at least one field of view;
determine a figure of merit corresponding to each pixel in each of the plurality of acquired images, wherein the figure of merit comprises a discrete approximation to a gradient vector; and
synthesize a composite image based upon the determined figures of merit.

22. The imaging device of claim 21, wherein the discrete approximation to the gradient vector comprises a discrete approximation to the gradient vector of an intensity of a green channel with respect to a spatial position of the green channel.

23. The imaging device of claim 21, wherein the imaging device comprises a digital optical microscope.

24. The imaging device of claim 21, further comprising a data repository for storing the composite image.

25. The imaging device of claim 21, wherein the controller is configured to acquire the plurality of images corresponding to at least one field of view by positioning the objective at a plurality of sample distances by displacing the objective along a first direction while the scanning stage is held at a fixed location to acquire a set of images corresponding to the location of the scanning stage.

26. The imaging device of claim 25, wherein the controller is further configured to acquire corresponding sets of images by positioning the scanning stage at a series of locations, wherein the controller is configured to position the scanning stage at the series of locations by translating the scanning stage in a second direction.

27. The imaging device of claim 26, wherein the first direction comprises a Z-direction, and the second direction comprises a X-Y direction.

28. The imaging device of claim 21, wherein the controller is configured to acquire the plurality of images corresponding to at least one field of view by positioning the objective at a plurality of sample distances by displacing the objective along a first direction while the scanning stage is simultaneously moved in a second direction to acquire a set of overlapping images.

29. The imaging device of claim 21, wherein the processing subsystem is further configured to:
for each pixel in each of the plurality of acquired images identify an image in the plurality of images that yields a best figure of merit for that pixel; and
assign a first value or a second value corresponding to each pixel in each of the plurality of images based upon the determined figures of merit.

30. The imaging device of claim 29, wherein the processing subsystem is further configured to:
generate an array for each image in the plurality of images;
populate each array based upon the determined figures of merit to generate a plurality of populated arrays; and
process each of the populated arrays using a bit mask to generate bit masked filtered arrays.

31. The imaging device of claim 30, wherein the processing subsystem is further configured to:
select pixels from each image in the plurality of acquired images based upon the bit masked filtered arrays;
process the bit masked arrays using a bicubic filter to generate a filtered output; and
blend the selected pixels as a weighted average of corresponding pixels across the plurality of acquired images based upon the filtered output to generate the composite image having an enhanced depth of field.

32. The imaging device of claim 31, further comprising a display to display the composite image.

* * * * *